(12) United States Patent
Yu et al.

(10) Patent No.: US 11,682,794 B2
(45) Date of Patent: Jun. 20, 2023

(54) ADDITIVE, NON-AQUEOUS ELECTROLYTE FOR LITHIUM SECONDARY BATTERY INCLUDING THE SAME, AND LITHIUM SECONDARY BATTERY INCLUDING THE NON-AQUEOUS ELECTROLYTE

(71) Applicant: LG Chem, Ltd., Seoul (KR)

(72) Inventors: Sung Hoon Yu, Daejeon (KR); Chul Haeng Lee, Daejeon (KR); Yoo Sun Kang, Daejeon (KR)

(73) Assignee: LG Energy Solution, Ltd.

( * ) Notice: Subject to any disclaimer, the term of this patent is extended or adjusted under 35 U.S.C. 154(b) by 590 days.

(21) Appl. No.: 16/610,637

(22) PCT Filed: Nov. 20, 2018

(86) PCT No.: PCT/KR2018/014277
§ 371 (c)(1),
(2) Date: Nov. 4, 2019

(87) PCT Pub. No.: WO2019/103434
PCT Pub. Date: May 31, 2019

(65) Prior Publication Data
US 2020/0058960 A1   Feb. 20, 2020

(30) Foreign Application Priority Data
Nov. 21, 2017  (KR) .................. 10-2017-0155471

(51) Int. Cl.
*H01M 10/0525* (2010.01)
*H01M 10/0567* (2010.01)
*H01M 10/0568* (2010.01)
*H01M 10/0569* (2010.01)
*C07F 9/09* (2006.01)
*C07F 9/14* (2006.01)

(52) U.S. Cl.
CPC ......... *H01M 10/0567* (2013.01); *C07F 9/091* (2013.01); *C07F 9/14* (2013.01); *H01M 10/0525* (2013.01); *H01M 10/0568* (2013.01); *H01M 10/0569* (2013.01); *H01M 2300/0037* (2013.01)

(58) Field of Classification Search
CPC ......... H01M 10/0567; H01M 10/0525; H01M 10/0568; H01M 10/0569; H01M 2300/0037
See application file for complete search history.

(56) References Cited

U.S. PATENT DOCUMENTS

| | | |
|---|---|---|
| 2004/0229128 A1 | 11/2004 | Noh |
| 2009/0136855 A1 | 5/2009 | Yamaguchi et al. |
| 2011/0281177 A1 | 11/2011 | Xu |
| 2012/0315549 A1 | 12/2012 | Tang et al. |
| 2013/0004859 A1 | 1/2013 | Yu et al. |
| 2013/0034759 A1* | 2/2013 | Funada ............. H01M 10/0525 429/188 |
| 2014/0093788 A1 | 4/2014 | Ahn et al. |
| 2014/0272556 A1 | 9/2014 | Mio et al. |
| 2015/0194704 A1 | 7/2015 | Garsuch et al. |
| 2016/0027592 A1 | 1/2016 | Shimamoto et al. |
| 2016/0294008 A1* | 10/2016 | Yoshida ................ C07C 303/28 |
| 2017/0125847 A1 | 5/2017 | Yu et al. |
| 2018/0034103 A1 | 2/2018 | Kubo et al. |
| 2019/0348714 A1 | 11/2019 | Yoshida et al. |

FOREIGN PATENT DOCUMENTS

| | | |
|---|---|---|
| CN | 104641496 A | 5/2015 |
| CN | 105074996 A | 11/2015 |
| CN | 105830272 A | 8/2016 |
| JP | 2000036332 A | 2/2000 |
| JP | 2015035409 A | 2/2015 |
| JP | 2016157679 A | 9/2016 |
| JP | 2017208322 A | 11/2017 |
| JP | 2020505732 A | 2/2020 |
| KR | 20060014280 A | 2/2006 |
| KR | 20090055483 A | 6/2009 |
| KR | 20120095975 A | 8/2012 |
| KR | 20140067109 A | 6/2014 |
| KR | 101520157 B1 | 5/2015 |
| KR | 20150139847 A | 12/2015 |
| KR | 20170052493 A | 5/2017 |
| WO | 2013058387 A1 | 4/2013 |
| WO | 2014163055 A1 | 10/2014 |

OTHER PUBLICATIONS

Pyschik et al., Reactions of the Additive 1,3-Propane Sultone with Electrolyte Compounds Investigated by Capillary Electrophoresis and High-Resolution Mass Spectrometry, Electrochimica Acta, Available online Aug. 2017, pp. 573-580, vol. 251.

International Search Report for Application No. PCT/KR2018/014277, dated Feb. 27, 2019, pp. 1-2.

* cited by examiner

*Primary Examiner* — Osei K Amponsah
(74) *Attorney, Agent, or Firm* — Lerner David LLP

(57) ABSTRACT

An additive, a non-aqueous electrolyte for a lithium secondary battery including the same, and a lithium secondary battery including the same are disclosed herein. In some embodiments, an additive includes at least one compound selected from the group consisting of the compounds represented by Formula 1 and Formula 2. In some embodiments, a non-aqueous electrolyte includes a lithium salt, an organic solvent, and an additive including at least one compound selected from the group consisting of the compounds represented by Formula 1 and Formula 2.

6 Claims, No Drawings

ADDITIVE, NON-AQUEOUS ELECTROLYTE FOR LITHIUM SECONDARY BATTERY INCLUDING THE SAME, AND LITHIUM SECONDARY BATTERY INCLUDING THE NON-AQUEOUS ELECTROLYTE

CROSS-REFERENCE TO RELATED APPLICATIONS

The present application is a national phase entry under 35 U.S.C. § 371 of International Application No. PCT/KR2018/014277, filed on Nov. 20, 2018, which claims priority from Korean Patent Application No. 10-2017-0155471, filed on Nov. 21, 2017, the disclosures of which are incorporated by reference herein.

TECHNICAL FIELD

The present invention relates to an additive, a non-aqueous electrolyte for a lithium secondary battery including the same, and a lithium secondary battery including the non-aqueous electrolyte, and more particularly, to an additive which may increase the life characteristics and high-temperature storage performance of a lithium secondary battery, a non-aqueous electrolyte for a lithium secondary battery including the same, and a lithium secondary battery including the non-aqueous electrolyte.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium secondary batteries are generally composed of a positive electrode, a negative electrode and an electrolyte. The lithium secondary batteries are classified according to the kind of the electrolyte as a lithium ion liquid battery (LILB) using a liquid state electrolyte, a lithium ion polymer battery (LiPB) using a gel-type polymer electrolyte, and a lithium polymer battery (LPB) using a solid polymer electrolyte.

Recently, as the application range of lithium secondary batteries is broadened, demand for lithium secondary batteries keeping good cycle life characteristics and safe charging with a high voltage under severe environments such as high temperature or low temperature environments and high voltage charging, is gradually increasing. Meanwhile, if a lithium secondary battery using a liquid electrolyte is stored at high temperature for a long time, the oxidation reaction of an electrolyte may occur at the surfaces of both electrodes and gas may be produced, thereby deforming the structure of the battery.

In order to solve the above-described defects, a method for restraining the oxidation reaction of the electrolyte by adding a material for uniformly forming coated films on the surfaces of both electrodes is suggested, and development on an additive used therein and an electrolyte including the same is required.

(Patent Document 0001) Japanese Laid-open Patent Publication No. 2000-036332

DISCLOSURE OF THE INVENTION

Technical Problem

An aspect of the present invention provides an additive which may markedly improve the high-temperature storage performance and life characteristics of a lithium secondary battery, and a non-aqueous electrolyte for a lithium secondary battery and a lithium secondary battery including the same.

Technical Solution

According to an aspect of the present invention, there is provided an additive including at least one compound selected from the group consisting of the compounds represented by the following Formula 1 and Formula 2:

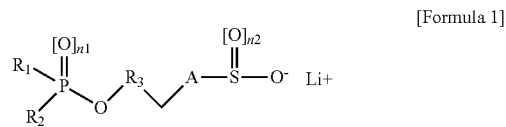
[Formula 1]

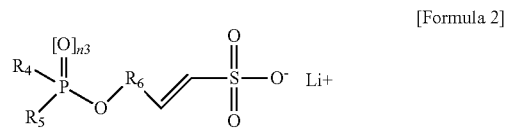
[Formula 2]

in Formula 1 and Formula 2, $R_1$, $R_2$, $R_4$ and $R_5$ are each independently hydrogen, a halogen group, a substituted or unsubstituted alkyl group of 1 to 5 carbon atoms or a substituted or unsubstituted alkoxy group of 1 to 5 carbon atoms, $R_3$ and $R_6$ are each independently a substituted or unsubstituted alkylene group of 1 to 5 carbon atoms, n1 and n3 are each independently an integer of 0 or 1, n2 is an integer of 1 to 2, and A is carbon or oxygen.

According to another aspect of the present invention, there is provided a non-aqueous electrolyte for a lithium secondary battery including a lithium salt; an organic solvent; and the additive.

In addition, according to another aspect of the present invention, there is provided a lithium secondary battery including a positive electrode; a negative electrode; a separator disposed between the positive electrode and the negative electrode; and the non-aqueous electrolyte for a lithium secondary battery.

Advantageous Effects

The additive according to the present invention utilizes a compound including a functional group in which two different kinds of heteroatoms are substituted, and coated films may be formed on the surfaces of both electrodes.

In addition, the compound used in the additive according to the present invention has a constant decomposition potential, and the functional group in which two different kinds of heteroatoms are substituted may be uniformly included in the coated films formed on both electrodes. Accordingly, the decomposition reaction of an electrolyte may be restrained and the life characteristics and storage properties at high temperature of a battery may be improved.

BEST MODE FOR CARRYING OUT THE INVENTION

Hereinafter, the present invention will be described in more detail.

It will be understood that words or terms used in the description and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the description are only for explaining exemplary embodiments and not intended to limit the present invention. The singular forms are intended to include the plural forms as well, unless the context clearly indicates otherwise.

It will be further understood that the terms "comprises", "comprising," or "having" when used in this description, specify the presence of stated features, numerals, steps, elements, or the combination thereof, but do not preclude the presence or addition of one or more other features, numerals, steps, elements, or the combination thereof.

Meanwhile, "*" used herein means a connected part between the same or different atoms or between the terminal parts of a formula unless otherwise indicated in the present invention.

Additive

The additive according to the present invention includes at least one compound selected from the group consisting of the compounds represented by the following Formula 1 and Formula 2:

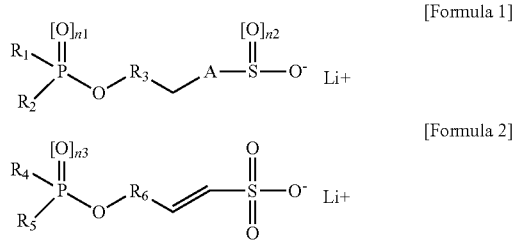

[Formula 1]

[Formula 2]

in Formula 1 and Formula 2, $R_1$, $R_2$, $R_4$ and $R_5$ are each independently hydrogen, a halogen group, a substituted or unsubstituted alkyl group of 1 to 5 carbon atoms or a substituted or unsubstituted alkoxy group of 1 to 5 carbon atoms, $R_3$ and $R_6$ are each independently a substituted or unsubstituted alkylene group of 1 to 5 carbon atoms, n1 and n3 are each independently an integer of 0 or 1, n2 is an integer of 1 to 2, and A is carbon or oxygen.

A lithium secondary battery using a liquid electrolyte has defects of deforming the structure of a battery with long periods of storage at high temperature due to the oxidation reaction of an electrolyte, occurring at the surface of an electrode. Accordingly, in order to solve such defects, studies on a method of adding a material which is capable of forming a coated film on the surfaces of both electrodes, or a material which is capable of restraining oxidation reaction, are being continuously conducted.

Generally, in a process of initial charging of a secondary battery, a solid electrolyte interphase (SEI) coated film which influences battery reaction is formed by the decomposition reaction of an electrolyte on the surface of a positive electrode and a negative electrode. The SEI coated film has properties of passing lithium ions but blocking the movement of electrons, and plays the role as a protecting coated film so that an electrolyte is not continuously decomposed. However, the SEI coated film may not keep continuous performance particularly under high temperature conditions and may be broken. Then, the decomposition reaction of an electrolyte may not be restrained by the SEI coated film in a continuous charging and discharging process, charges may be irreversibly consumed, and the reversible capacity of a battery may decrease to degrade the performance of a battery.

Accordingly, studies on a method using two different kinds of additives which may easily form SEI coated films on the surfaces of both electrodes and restrain the decomposition reaction of an electrolyte are being actively conducted.

For example, if a compound including a sulfur atom (S) which is one of a heteroatom is used as an additive, SEI coated films may be formed on the surface of a positive electrode and salt anions may be stabilized due to the unshared electron pair of the sulfur atom and thus, the decomposition reaction of an electrolyte may be restrained. In this case, if a compound including a phosphor atom (P) is used together as the additive, a coated film is formed on the surface of a negative electrode, and the oxidation reaction of an electrolyte may be restrained.

However, two or more kinds of the additives in which different heteroatoms are substituted have different electrochemical decomposition potentials for forming a SEI coated film. In this case, SEI coated films may be formed at the surfaces of both electrodes, but the compounds included in each additive included in an electrolyte may not be uniformly distributed in the coated film, and non-uniform SEI coated films may be formed on the surfaces of both electrodes. In addition, though the coated films are formed on the surfaces of both electrodes, SEI coated films are unstably formed, and effective restraining of the decomposition reaction of an electrolyte may be difficult. Accordingly, the storage performance of a battery at high temperature may be degraded.

Therefore, in order to solve the above-described defects, the inventors of the present invention created a method of using a compound including all functional groups in which different two kinds of heteroatoms are substituted in one compound, as an additive. Particularly, the inventors devised the use of a compound including both a functional group in which a phosphor atom (P) is substituted and a functional group in which a sulfur atom (S) is substituted, as an additive. If all functional groups in which different heteroatoms are substituted, are included in one compound, SEI coated films may be formed on the surfaces of both electrodes, and compounds having a functional group in which a phosphor atom (P) is substituted and a functional group in which a sulfur atom (S) is substituted, may be uniformly distributed in the SEI coated film thus formed, and the oxidation reaction of an electrolyte may be effectively restrained.

More particularly, the compound represented by Formula 1 may include at least one compound selected from the compounds represented by the following Formula 1-1 to Formula 1-4:

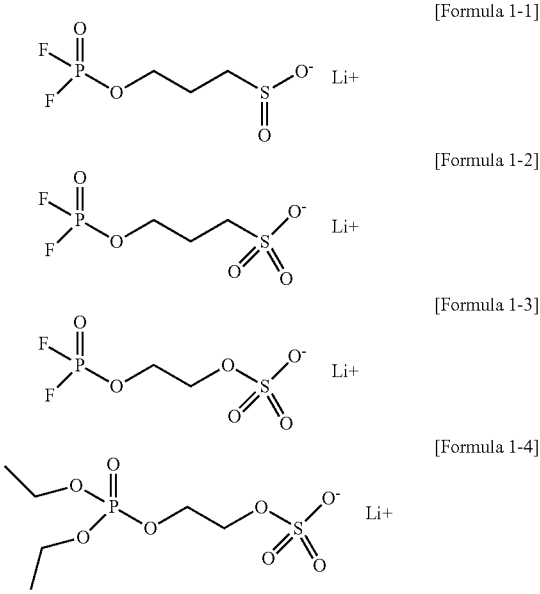

[Formula 1-1]

[Formula 1-2]

[Formula 1-3]

[Formula 1-4]

Particularly, in the compounds represented by Formula 1-1 to Formula 1-3 in the compound represented by Formula 1, fluorine atom which is halogen is substituted, and a coated film may be formed well on the surface of an electrode, and the conductivity of the coated film thus formed may be increased. In addition, inorganic components such as lithium fluoride (LiF) may increase in the coated film thus formed, and the coated film may be stably formed.

In addition, the compound represented by Formula 2 may include at least one compound selected from the group consisting of the compounds represented by the following Formulae 2-1 and 2-2:

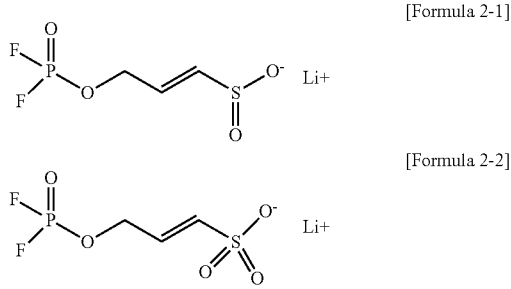

[Formula 2-1]

[Formula 2-2]

Meanwhile, the compounds represented by Formula 2 may further include a carbon-carbon double bond which may form a coated film on the surface of a negative electrode, and thus, the forming effect of a SEI coated film may be excellent.

Non-Aqueous Electrolyte for Lithium Secondary Battery

Next, a non-aqueous electrolyte for a lithium secondary battery according to the present invention will be explained.

A non-aqueous electrolyte for a lithium secondary battery according to another embodiment of the present invention includes a lithium salt, an organic solvent and an additive.

In this case, the additive is the same as described above. Meanwhile, the additive may be included in an amount of 0.1 to 5 parts by weight, preferably, 0.15 to 5 parts by weight, more preferably, 0.5 to 5 parts by weight with respect to 100 parts by weight of the non-aqueous electrolyte for a lithium secondary battery. If the amount of the additive is within the range, SEI coated films on both electrodes may be kept stably, the decomposition reaction of an electrolyte may be restrained, and the solubility in the non-aqueous electrolyte for a lithium secondary battery may be kept to a certain degree or above. Accordingly, the increase of resistance due to unreacted residual additive may be prevented.

The lithium salt is used as an electrolyte salt in a lithium secondary battery and is used as a medium for transporting ions. Commonly, the lithium salt may include at least one compound selected from the group consisting of $LiPF_6$, $LiBF_4$, $LiSbF_6$, $LiAsF_6$, $LiClO_4$, $LiN(C_2F_5O_3)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and preferably, may include $LiPF_6$ or LiFSI, without limitation.

In this case, the lithium salt may be appropriately changed in a range commonly used. For appropriate ionic conductivity and viscosity, the lithium salt may be used in an electrolyte in a concentration range of 0.5 to 3 M, preferably, 0.8 to 2.5 M, more preferably, 0.8 to 2 M. In a case where the concentration of the lithium salt is included within the above range, the impregnation properties of an electrode may be kept to a certain degree or above, and the charging and discharging of a battery may be easily performed.

In addition, as the organic solvent, any one which may play the role of a medium for transporting ions which are taking part in the electrochemical reaction of a battery may be used, without specific limitation. Particularly, as the organic solvent, a linear carbonate compound, a cyclic carbonate compound, an ether compound, an ester compound, etc. may be used alone or as a mixture of two or more thereof. Among them, the cyclic carbonate compound, the linear carbonate compound, or a mixture thereof may be typically included.

Particular examples of the cyclic carbonate compound may be any one selected from the group consisting of ethylene carbonate (EC), propylene carbonate (PC), 1,2-butylene carbonate, 2,3-butylene carbonate, 1,2-pentylene carbonate and 2,3-pentylene carbonate, or a mixture of two or more thereof. In addition, particular examples of the linear carbonate compound may be any one selected from the group consisting of dimethyl carbonate (DMC), diethyl carbonate (DEC), dipropyl carbonate, methyl ethyl carbonate (MEC), ethyl methyl carbonate (EMC), methyl propyl carbonate and ethyl propyl carbonate, or a mixture of two or more thereof, without limitation.

Particularly, ethylene carbonate and propylene carbonate, which are cyclic carbonates among the carbonate compounds, are organic solvents having high viscosity, have high dielectric constant and dissociate lithium salts in an electrolyte well, and may preferably be used. If such cyclic carbonate and a linear carbonate with low viscosity and low dielectric constant such as dimethyl carbonate and diethyl carbonate are mixed in an appropriate ratio and used, an electrolyte having high electroconductivity may be prepared and may preferably be used.

The ether compound may be any one selected from the group consisting of dimethyl ether, diethyl ether, dipropyl ether, methyl ethyl ether, methyl propyl ether and ethyl propyl ether, or a mixture of two or more thereof, without limitation.

The ester compound may be any one selected from the group consisting of a linear ester selected from the group consisting of methyl propionate, ethyl propionate (EP), propyl propionate (PP), n-propyl propionate, iso-propyl propionate, n-butyl propionate, iso-butyl propionate and tert-butyl propionate; and a cyclic ester such as γ-butyrolactone, γ-valerolactone, γ-caprolactone, σ-valerolactone, and ε-caprolactone, or a mixture of two or more thereof, without limitation.

In the present invention, preferably, ethylene carbonate and ethyl methyl carbonate may be mixed and used, and the mixing ratio thereof may be 10:90 to 40:60, more preferably, 20:80 to 40:60. If such compounds are mixed and used as an organic solvent, a non-aqueous electrolyte having appropriate ion conductivity may be provided, and the mobility of lithium ions in a battery may be improved and the stability of a battery may be improved.

<Lithium Secondary Battery>

Then, a lithium secondary battery according to the present invention will be explained. A secondary battery according to another embodiment of the present invention includes a positive electrode, a negative electrode, a separator disposed between the positive electrode and the negative electrode, and a non-aqueous electrolyte for a lithium secondary battery. The explanation on the non-aqueous electrolyte for a lithium secondary battery is the same as described above, and particular explanation thereof will be omitted.

Particularly, the lithium secondary battery according to the present invention may be manufactured by injecting the non-aqueous electrolyte for a lithium secondary battery into an electrode structure composed of a positive electrode, a negative electrode, a separator disposed between the positive electrode and the negative electrode. In this case, commonly used elements for manufacturing a lithium secondary battery may be used for the positive electrode, the negative electrode, and the separator constituting the electrode structure.

The positive electrode may be manufactured by coating a positive electrode mixture slurry including a positive electrode active material, a binder, a conductive agent and a solvent on a positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with carbon, nickel, titanium, silver, or the like may be used.

The positive electrode active material is a compound capable of reversibly intercalating and deintercalating lithium, and may include particularly, a lithium composite metal oxide including one or more metals such as cobalt, manganese, nickel and aluminum, and lithium. More particularly, the lithium composite metal oxide may include a lithium-manganese-based oxide (for example, $LiMnO_2$, $LiMn_2O_4$, etc.), a lithium-cobalt-based oxide (for example, $LiCoO_2$, etc.), a lithium-nickel-based oxide (for example, $LiNiO_2$, etc.), a lithium-nickel-manganese-based oxide (for example, $LiNi_{1-Y1}Mn_{Y1}O_2$ (where $0<Y1<1$), $LiMn_{2-Z1}Ni_{Z1}O_4$ (where $0<Z1<2$), etc.), a lithium-nickel-cobalt-based oxide (for example, $LiNi_{1-Y2}Co_{Y2}O_2$ (where $0<Y2<1$), etc.), a lithium-manganese-cobalt-based oxide (for example, $LiCo_{1-Y3}Mn_{Y3}O_2$ (where $0<Y3<1$), $LiMn_{2-Z2}Co_{Z2}O_4$ (where $0<Z2<2$), etc.), a lithium-nickel-manganese-cobalt-based oxide (for example, $Li(Ni_{p1}Co_{q1}Mn_{r1})O_2$ (where $0<p1<1$, $0<q1<1$, $0<r1<1$, $p1+q1+r1=1$), $Li(Ni_{p2}Co_{q2}Mn_{r2})O_4$ (where $0<p2<2$, $0<q2<2$, $0<r2<2$, $p2+q2+r2=2$), etc.), or a lithium-nickel-cobalt-transition metal (M) oxide (for example, $Li(Ni_{p3}Co_{q3}Mn_{r3}M_{s1})O_2$ (where M is selected from the group consisting of Al, Fe, V, Cr, Ti, Ta, Mg and Mo, p3, q3, r3 and s1 are atomic fractions of each independent element, and $0<p3<1$, $0<q3<1$, $0<r3<1$, $0<s1<1$, $p3+q3+r3+s1=1$), and one of them or a compound of two or more thereof may be included.

In respect of increasing the capacity characteristics and stability of a battery, the lithium composite metal oxide may be $LiCoO_2$, $LiMnO_2$, $LiNiO_2$, lithium nickel manganese cobalt oxide (for example, $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or lithium nickel cobalt aluminum oxide (for example, $LiNi_{0.8}Co_{0.15}Al_{0.05}O_2$, etc.), etc., and in respect of the remarkable improving effect according to the control of the kind and amount ratio of configuration elements which form the lithium composite metal oxide, the lithium composite metal oxide may be $Li(Ni_{0.6}Mn_{0.2}Co_{0.2})_2$, $Li(Ni_{0.5}Mn_{0.3}Co_{0.2})O_2$, $Li(Ni_{0.7}Mn_{0.13}Co_{0.15})O_2$, $Li(Ni_{0.8}Mn_{0.1}Co_{0.1})O_2$, etc., and any one of them or a mixture of two or more thereof may be used.

The positive electrode active material may be included in an amount of 80 to 99 wt %, more preferably, 85 to 99 wt % based on the total solid content excluding the solvent from the positive electrode mixture slurry.

The binder is a component assisting the adhesion between the active material and the conductive agent, and the adhesion to the current collector. Examples of the binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, or various copolymers.

The binder may be included in an amount of 1 to 20 wt %, more preferably, 1 to 15 wt % based on the total solid content excluding the solvent from the positive electrode mixture slurry.

The conductive agent is a component to further increase the conductivity of the positive electrode active material, wherein any conductive agent may be used without particular limitation as long as it has conductivity without causing adverse chemical changes in the battery. For example, the conductive agent may be graphite; carbon based materials such as carbon black, acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxides such as titanium oxide; or conductive materials such as polyphenylene derivatives. Particular commercial examples of the conductive agent include acetylene black series of Chevron Chemical Company, Denka Singapore Private Limited, Gulf Oil Company, etc, Ketjen black series, EC series (Armak Company), Vulcan XC-72 (Cabot Company) and Super P (Timcal Co.), etc.

The conductive agent may be included in an amount of 1 to 20 wt %, more preferably, 1 to 15 wt % based on the total weight of the positive electrode mixture slurry excluding the solvent.

The solvent may include an organic solvent such as N-methyl-2-pyrrolidone (NMP), etc., and may be used in an amount achieving preferable viscosity if the positive electrode active material, and selectively the binder and the conductive agent are included. For example, with respect to 100 parts by weight of the solvent, 20 to 100 parts by weight, preferably, 25 to 100 parts by weight, more preferably, 30 to 100 parts by weight of the solid content including the positive electrode active material, and selectively the binder and the conductive agent may be included.

In addition, the negative electrode may be manufactured by coating a negative electrode mixture slurry including a negative electrode active material, a binder, a conductive agent and a solvent on a negative electrode collector.

The negative electrode collector generally has a thickness of 3 to 500 µm. The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with carbon, nickel, titanium, silver, or the like, and an aluminum-cadmium alloy may be used. Also, similar to the positive electrode collector, microscopic irregularities may be formed on the surface of the collector to improve the adhesion of a negative electrode active material. The negative electrode collector may be used in various shapes such as a film, a sheet, a foil, a net, a porous body, a foam body, a non-woven fabric body, and the like.

The negative electrode active material may include one kind or two or more kinds selected from the group consisting of natural graphite, artificial graphite, a carbonaceous material; a metallic compound (Me) such as a lithium-containing titanium composite oxide (LTO), Si, Sn, Li, Zn, Mg, Cd, Ce, Ni and Fe; an alloy of the metallic compound (Me); an oxide (MeOx) of the metallic compound (Me); and a composite of the metallic compound and carbon.

The negative electrode active material may be included in an amount of 80 to 99 wt %, more preferably, 85 to 99 wt % based on a total solid content of the negative electrode mixture slurry excluding the solvent.

The binder is a component that assists the adhesion between the conductive agent, the active material, and the current collector. Examples of the binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The binder is added in an amount of 1 to 20 wt %, more preferably, 1 to 15 wt % based on the total solid content of the negative electrode mixture slurry excluding the solvent.

The conductive agent is a component for further improving conductivity of the negative electrode active material. The conductive agent is not particularly limited as long as it has conductivity without causing adverse chemical changes in the battery. For example, a conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxide such as titanium oxide; or a conductive material such as polyphenylene derivatives may be used.

The conductive agent may be added in an amount of 1 to 20 wt %, more preferably, 1 to 15 wt % based on the total solid content of the negative electrode mixture slurry excluding the solvent.

The solvent may include water or an organic solvent such as N-methyl-2-pyrrolidone (NMP), in an amount of achieving preferable viscosity with the inclusion of the negative electrode active material, and selectively a binder, a conductive agent, etc. For example, with respect to 100 parts by weight of the solvent, the solid content of the negative electrode active material, selectively including a binder and a conductive agent may be included in an amount of 50 to 150 parts by weight, preferably, 50 to 140 parts by weight, more preferably, 50 to 130 parts by weight.

In addition, the separator may be any separator as long as it is typically used as the conventional separator. For example, a porous polymer film manufactured using a polyolefin-based polymer such as an ethylene homopolymer (polyethylene), a propylene homopolymer, an ethylene/butene copolymer, an ethylene/hexene copolymer, and an ethylene/methacrylate copolymer, may be used alone, or a stacked structure having two or more layers thereof may be used. Also, a typical porous nonwoven fabric, for example, a nonwoven fabric formed of high melting point glass fibers or polyethylene terephthalate fibers may be used, without limitation.

The shape of the lithium secondary battery of the present invention is not particularly limited, but a cylindrical type using a can, a prismatic type, a pouch type, or a coin type may be used.

According to another embodiment of the present invention, a battery module including the lithium secondary battery as a unit cell and a battery pack including the battery module are provided.

MODE FOR CARRYING OUT THE INVENTION

Hereinafter, the present invention will be described in more detail referring to preferred embodiments. However, the embodiments are only for assisting the understanding of the present invention and should not be construed to limit the scope of the present invention. It would be obvious for a person skilled in the art that various changes and modifications are apparent within the scope of this description and the technical spirit and such changes and modifications definitely are included in the scope of the attached claims.

EXAMPLES

1. Example 1

(1) Preparation of Non-Aqueous Electrolyte for Lithium Secondary Battery

Ethylene carbonate (EC) and ethyl methyl carbonate (EMC) were mixed in a ratio of 30:70 (vol %) and $LiPF_6$ was dissolved therein so that a concentration of 1 M was attained to prepare an organic solvent. Then, to 99 g of the organic solvent, 1.0 g of the compound of Formula 1-1 was added as an additive to prepare a non-aqueous electrolyte for a lithium secondary battery.

(2) Manufacture of Positive Electrode

To 100 parts by weight of a N-methyl-2-pyrrolidone (NMP) solvent, 40 parts by weight of a solid content obtained by mixing positive electrode active material: (Li($Ni_{0.5}Mn_{0.3}Co_{0.2}$)$O_2$):conductive agent (carbon black):binder (polyvinylidene fluoride (PVDF)) in a ratio of 90:5:5 wt % was added to prepare a positive electrode mixture slurry. Then, a positive electrode collector (Al thin film) with a thickness of 100 µm was coated with the positive electrode mixture slurry, and drying and roll pressing were performed to manufacture a positive electrode.

(3) Manufacture of Negative Electrode

To 100 parts by weight of a N-methyl-2-pyrrolidone (NMP) solvent, 100 parts by weight of a solid content obtained by mixing natural graphite and SiOx (0≤x≤1) as negative electrode active materials, a conductive agent (carbon black), and a binder (polyvinyidenefluoride (PVDF)) in a ratio of 90:5:3:2 wt % was added to prepare a negative electrode mixture slurry. Then, a negative electrode collector (Cu thin film) with a thickness of 90 μm was coated with the negative electrode mixture slurry, and drying and roll pressing were performed to manufacture a negative electrode.

(4) Manufacture of Lithium Secondary Battery

The positive electrode and the negative electrode thus manufactured were stacked with a polyethylene porous film to manufacture an electrode assembly, and then the electrode assembly was put in a pouch type battery case. The non-aqueous electrolyte for a lithium secondary battery thus prepared was injected and sealed to manufacture a lithium secondary battery.

2. Example 2

A non-aqueous electrolyte for a lithium secondary battery and a lithium secondary battery including the same were manufactured by the same method as described in Example 1 except for using the compound of Formula 1-2 instead of the compound of Formula 1-1 as the additive during preparing the non-aqueous electrolyte for a lithium secondary battery in Example 1.

3. Example 3

A non-aqueous electrolyte for a lithium secondary battery and a lithium secondary battery including the same were manufactured by the same method as described in Example 1 except for using the compound of Formula 1-3 instead of the compound of Formula 1-1 as the additive during preparing the non-aqueous electrolyte for a lithium secondary battery in Example 1.

4. Example 4

A non-aqueous electrolyte for a lithium secondary battery and a lithium secondary battery including the same were manufactured by the same method as described in Example 1 except for using the compound of Formula 1-4 instead of the compound of Formula 1-1 as the additive during preparing the non-aqueous electrolyte for a lithium secondary battery in Example 1.

5. Example 5

A non-aqueous electrolyte for a lithium secondary battery and a lithium secondary battery including the same were manufactured by the same method as described in Example 1 except for using the compound of Formula 2-1 instead of the compound of Formula 1-1 as the additive during preparing the non-aqueous electrolyte for a lithium secondary battery in Example 1.

6. Example 6

A non-aqueous electrolyte for a lithium secondary battery and a lithium secondary battery including the same were manufactured by the same method as described in Example 1 except for using the compound of Formula 2-2 instead of the compound of Formula 1-1 as the additive during preparing the non-aqueous electrolyte for a lithium secondary battery in Example 1.

COMPARATIVE EXAMPLES

1. Comparative Example 1

A lithium secondary battery was manufactured by the same method as described in Example 1 except for using 100 g of an organic solvent prepared by mixing ethylene carbonate (EC) and ethyl methyl carbonate (EMC) in a ratio of 30:70 (vol %) without using an additive, and dissolving $LiPF_6$ therein to achieve a concentration of 1 M, as a non-aqueous electrolyte for a lithium secondary battery.

2. Comparative Example 2

A non-aqueous electrolyte for a lithium secondary battery and a lithium secondary battery including the same were manufactured by the same method as described in Example 1 except for using $LiPO_2F_2$ instead of the compound of Formula 1-1 as the additive during preparing the non-aqueous electrolyte for a lithium secondary battery in Example 1.

3. Comparative Example 3

A non-aqueous electrolyte for a lithium secondary battery and a lithium secondary battery including the same were manufactured by the same method as described in Example 1 except for using methyl ethanesulfonate (MES) instead of the compound of Formula 1-1 as the additive during preparing the non-aqueous electrolyte for a lithium secondary battery in Example 1.

4. Comparative Example 4

A lithium secondary battery was manufactured by the same method as described in Example 1 except for preparing a non-aqueous electrolyte for a lithium secondary battery by preparing 98.0 g of an organic solvent by mixing ethylene carbonate (EC) and ethyl methyl carbonate (EMC) in a ratio of 30:70 (vol %) and dissolving $LiPF_6$ therein to achieve a concentration of 1 M, and using 1.0 g of $LiPO_2F_2$ and 1.0 g of methyl ester sulfate (MES) as additives.

EXPERIMENTAL EXAMPLES

1. Experimental Example: Measurement of High-Temperature Storage Characteristics The secondary batteries manufactured in Examples 1 to 6 and Comparative Examples 1 to 4, were charged at 0.8 C rate to 4.35 V under constant current/constant voltage conditions and cut off charged at 0.05 C, and then, discharged at 0.5 C to a voltage of 3.0 V (initial discharge capacity). Thereafter, the batteries were charged at 0.8 C rate to 4.35 V under constant current/constant voltage conditions and cut off charged at 0.05 C, and then, stored at 60° C. for 2 weeks. After the storage, the thickness of a pouch type battery was measured and thickness increase rate was found.

Then, the batteries were discharged at 0.5 C to 3.0 V and the discharge amounts were measured (residual discharge rate). Again, the batteries were charged at 0.8 C rate to 4.35 V under constant current/constant voltage conditions and cut off charged at 0.05 C, and then, discharged at 0.5 C to a voltage of 3.0 V (recovery discharge rate). In this case, the measured thickness increase rate, the residual discharge capacity and the recovery discharge capacity are listed in Table 1 below. Meanwhile, the residual discharge rate and the recovery discharge rate are shown by % with respect to the initial discharge capacity.

TABLE 1

| | Organic solvent content (g) | Additive Compound | Additive Content (g) | Thickness increase rate (%) | Residual discharge rate (%) | Recovery discharge rate (%) |
|---|---|---|---|---|---|---|
| Example 1 | 99.0 | 1-1 | 1.0 | 105 | 90 | 97 |
| Example 2 | 99.0 | 1-2 | 1.0 | 106 | 89 | 95 |
| Example 3 | 99.0 | 1-3 | 1.0 | 108 | 90 | 97 |
| Example 4 | 99.0 | 1-4 | 1.0 | 108 | 91 | 95 |
| Example 5 | 99.0 | 2-1 | 1.0 | 103 | 95 | 97 |
| Example 6 | 99.0 | 2-2 | 1.0 | 107 | 88 | 93 |
| Comparative Example 1 | 100 | — | — | 133 | 76 | 83 |
| Comparative Example 2 | 99.0 | $LiPO_2F_2$ | 1.0 | 125 | 78 | 83 |
| Comparative Example 3 | 99.0 | MES | 1.0 | 112 | 81 | 88 |
| Comparative Example 4 | 98.0 | $LiPO_2F_2$, MES | 1.0, 1.0 | 115 | 80 | 85 |

As shown in Table 1, the secondary batteries of Examples 1 to 6 including the additive of the present invention maintained the capacity though cycles were processed at high temperature, and showed excellent residual discharge rate and recovery discharge rate when compared with the secondary battery of Comparative Example 1 which did not include an additive.

Meanwhile, the residual discharge rate and the recovery discharge rate of the batteries of Example 1 to Example 6 were better than the secondary battery of Comparative Example 2 or Comparative Example 3, which used an additive including only a functional group in which a phosphor atom (P) or a sulfur atom (S), which was a heteroatom, was substituted.

Further, the residual discharge rate and the recovery discharge rate of the secondary batteries of Examples 1 to 6 were better than the secondary battery of Comparative Example 4 using a mixture of two kinds of additives including a functional group in which two different kinds of heteroatoms were substituted.

2. Experimental Example: Measurement of Cycle Capacity Retention

Each of the secondary batteries manufactured in Examples 1 to 6 and Comparative Examples 1 to 4, was charged at 0.8 C rate to 4.35 V under constant current/constant voltage conditions and cut off charged at 0.05 C, and then, discharged at 0.5 C to a voltage of 3.0 V. Then, the batteries were charged at 0.8 C rate to 4.35 V under constant current/constant voltage conditions and cut off charged at 0.05 C, and then, discharged at 0.5 C rate to 3.0 V at room temperature, and this cycle was repeated 200 times. Cycle capacity retentions (%) after repeating 200 times are listed with respect to the cycle capacity retention after performing one cycle in Table 2.

TABLE 2

| | Capacity retention (%) |
|---|---|
| Example 1 | 85 |
| Example 2 | 84 |
| Example 3 | 84 |
| Example 4 | 85 |
| Example 5 | 88 |
| Example 6 | 85 |
| Comparative Example 1 | 63 |
| Comparative Example 2 | 74 |
| Comparative Example 3 | 68 |
| Comparative Example 4 | 70 |

As shown in Table 2, the secondary batteries of Example 1 to Example 6, which included the additive of the present invention were found to have higher cycle capacity retention and further improved life characteristics than the secondary batteries of Comparative Examples 1 to 4.

The invention claimed is:

1. An additive comprising at least one compound selected from the group consisting of the compounds represented by the following Formula 1 and Formula 2:

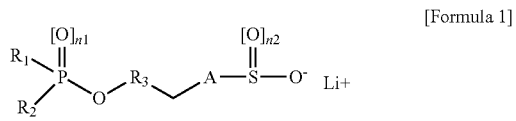

[Formula 1]

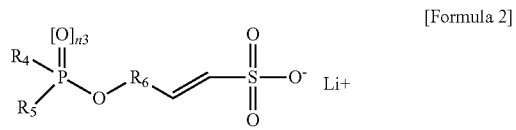

[Formula 2]

in Formula 1 and Formula 2, $R_1$ is hydrogen or a halogen group, $R_4$ is hydrogen, a halogen group, a substituted or unsubstituted alkyl group of 1 to 5 carbon atoms or a substituted or unsubstituted alkoxy group of 1 to 5 carbon atoms, $R_2$ and $R_5$ are each independently hydrogen, a halogen group, an unsubstituted alkyl group of 1 to 5 carbon atoms or a substituted alkoxy group of 1 to 5 carbon atoms, $R_3$ and $R_6$ are each independently a substituted or unsubstituted alkylene group of 1 to 5 carbon atoms, n1 and n3 are each independently an integer of 0 or 1, n2 is an integer of 1 to 2, and A is carbon or oxygen.

2. The additive according to claim 1, wherein the compound represented by Formula 1 comprises at least one compound selected from the group consisting of the compounds represented by following Formula 1-1 to Formula 1-4:

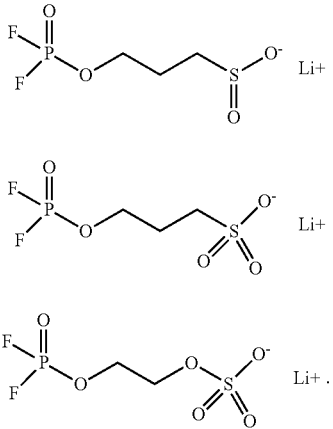

[Formula 1-1]

[Formula 1-2]

[Formula 1-3]

3. The additive according to claim 1, wherein the compound represented by Formula 2 comprises at least one compound selected from the group consisting of the compounds represented by the following Formula 2-1 and Formula 2-2:

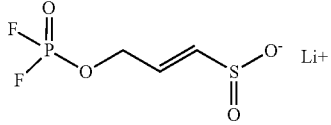

[Formula 2-1]

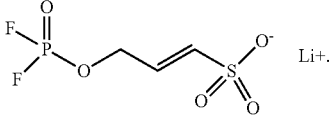

[Formula 2-2]

4. A non-aqueous electrolyte for a lithium secondary battery, comprising:
 a lithium salt;
 an organic solvent; and
 the additive of claim 1.

5. The non-aqueous electrolyte according to claim 4, wherein the additive is present in an amount of 0.1 to 5 parts by weight with respect to 100 parts by weight of the non-aqueous electrolyte.

6. A lithium secondary battery, comprising:
 a positive electrode;
 a negative electrode;
 a separator disposed between the positive electrode and the negative electrode; and
 the non-aqueous electrolyte of claim 4.

* * * * *